United States Patent [19]
Galbiati

[11] Patent Number: 5,917,720
[45] Date of Patent: *Jun. 29, 1999

[54] METHOD AND CIRCUIT FOR DRIVING A BRIDGE BY A PWM PROCEDURE

[75] Inventor: Ezio Galbiati, Agnadello, Italy

[73] Assignee: STMicroelectronics, S.r.l., Agrate Brianza, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/716,792

[22] Filed: Aug. 30, 1996

[30] Foreign Application Priority Data

Aug. 31, 1995 [EP] European Pat. Off. ............. 95830371

[51] Int. Cl.$^6$ .......................... H02M 3/24; H02M 1/12; H02M 7/537
[52] U.S. Cl. .................. 363/98; 363/131; 363/41
[58] Field of Search .................. 363/98, 131, 41

[56] References Cited

U.S. PATENT DOCUMENTS

| | | | |
|---|---|---|---|
| 5,153,492 | 10/1992 | Landseadel | 318/599 |
| 5,204,594 | 4/1993 | Carbolante | 363/98 |
| 5,233,509 | 8/1993 | Ghotbi | 363/89 |
| 5,245,520 | 9/1993 | Imbertson | 363/98 |
| 5,362,422 | 11/1994 | Close et al. | 363/98 |
| 5,379,209 | 1/1995 | Golf | 363/132 |
| 5,539,630 | 7/1996 | Pietkiewicz et al. | 363/98 |
| 5,546,294 | 8/1996 | Schutten et al. | 363/17 |
| 5,568,373 | 10/1996 | Small | 363/98 |
| 5,583,402 | 12/1996 | Moisin et al. | 315/307 |
| 5,629,844 | 5/1997 | Krichtafovitch et al. | 363/65 |
| 5,631,817 | 5/1997 | Minami | 363/98 |
| 5,633,791 | 5/1997 | Poon et al. | 363/56 |

FOREIGN PATENT DOCUMENTS 0 441 459 A1  8/1991  European Pat. Off. .......... H02P 7/00

*Primary Examiner*—Peter S. Wong
*Assistant Examiner*—Bao Q. Vu
*Attorney, Agent, or Firm*—David V. Carlson; E. Russell Tarleton; Seed and Berry LLP

[57] ABSTRACT

A circuit for driving a bridge circuit BR having a signal input I1,I2, and a signal output O1–O2, and at least two conduction control signals C1 and C2 by the PWM procedure. The circuit includes a first virtually-square-wave generator CO1 having an output coupled to one of the two control inputs and a second virtually-square-wave generator CO2 having an output coupled to the other of the two control inputs. In this manner, the bridge is driven by two square waves, the null value of the current at the output )O1–O2 no longer constitutes an intrinsic discontinuity and any value, even around zero, is controllable with relative ease.

23 Claims, 4 Drawing Sheets

METHOD AND CIRCUIT FOR DRIVING A BRIDGE BY A PWM PROCEDURE

TECHNICAL FIELD

The present invention relates to a method of driving by the PWM procedure a bridge circuit.

BACKGROUND OF THE INVENTION

Driving of loads by the Pulse Width Modulation (PWM) procedure through output stages consisting of bridge circuits is a fairly widespread practice in various electrical systems and in particular for direct current spindle motors and direct current voice coil motors. It is often useful to be able to control not only the intensity but also the direction of the current supplied to the load by the bridge circuit.

A complete collection of articles on this subject can be found in the catalog of SGS-THOMSON MICROELECTRONICS, "Designers' Guide to Power Products", June 1992 version, in the chapter entitled "DC and Brushless Motors".

A simplified diagram of a bridge circuit is shown in FIG. 1. The bridge circuit includes two terminals I1 and I2 for a signal input, two terminals O1 and O2 for a signal output, and two terminals C1 and C2 for control inputs. The main conduction paths, i.e., drain-source, of four n-channel MOS transistors T1, T2, T3 and T4 constitute the branches of the bridge circuit. The control terminal of transistors T1 and T3 are connected directly to the terminals C1 and C2, respectively. The control terminal of the transistor T2 is connected to the terminal C1 through an inverter P1. The control terminal of the transistor T4 is connected to the terminal C2 through an inverter P2. A load LD, represented by a motor symbol but not part of the bridge circuit, is shown between the terminals O1 and O2 in FIG. 1.

Typically, terminal I1 is coupled to a power potential reference VDD and terminal I2 is coupled to a ground potential reference GND as shown in FIG. 2.

If the potential at the terminal C1 is high, the transistor T1 is on and the transistor T2 is off. If the potential at the terminal C1 is low, the transistor T1 is off and the transistor T2 is on. All this applies similarly for the terminal C2 and the transistors T3 and T4.

By applying appropriately conduction control signals to the terminals C1 and C2 there can be obtained at the output O1–O2 a voltage signal having a virtually square wave form with a duty cycle such that the average current flowing in the load connected to the output O1–O2 of the bridge circuit assumes the desired value.

A simple and known way to drive the control inputs C1 and C2 of the bridge circuit is to send to one of the inputs, e.g., C1, a first voltage conduction control signal having a constant value and to the other input, e.g., C2, a second voltage conduction control signal consisting of a virtually square wave. By controlling the duty cycle of this second signal one controls the duty cycle of the output O1–O2 and consequently the intensity of the average current in the load LD. When it is desired to obtain an average current of the same intensity but opposite direction it suffices to send the first signal to the input C2 and the second signal to the input C1.

FIG. 2 shows a bridge circuit BR, similar to the bridge circuit shown in FIG. 1, having input terminal I1 connected to the reference VDD and input terminal I2 coupled to the reference GND in combination with a driving circuit. The driving circuit includes an oscillator OS0 designed to generate square waves with fixed frequency and duty cycle at one of its outputs. A resistor RS for detection only of the current module is connected between the terminal I2 and the reference GND. A comparator CO0 has a non-inverting input connected to the resistor RS and an inverting input receiving a reference signal VR corresponding to the desired current at the output O1–O2. A flip-flop FF of the SR type has a set terminal S connected to the output of the oscillator OS0 and reset terminal R connected to an output of the comparator CO0. Two AND logical gates G1 and G2 have first inputs connected together to a state output Q of the flip-flop FF and second inputs receiving respectively two logical signals L1 and L2, one inverted with respect to the other.

The circuit of FIG. 2 operates in accordance with the structure just described. Indeed, one of the signals L1 and L2 will necessarily have a low logical value and thus the output of the AND logical gate to which it is connected will have a low logical value regardless of the logical value of the output Q. During constant frequency operation, a square wave with constant frequency and constant average duty (cycle is linked to the value of the signal VR and will be present at the output Q. A similar effect would be obtained in the circuit of FIG. 2 when the oscillator OS0 and the flip-flop FF are replaced with a monostable circuit started by the output of the comparator CO0. At operating condition however, the output of the monostable would provide a square wave with constant average frequency and constant average duty cycle. This is constant off time (Toff) operation.

Such a circuit exhibits a lower intrinsic limit for the controllable current. Additionally, the duty cycle of the wave at the output Q cannot decrease continuously to zero. Even if it were possible to control the duty cycle of this square wave to very low values, the bridge BR could not respond adequately to very short pulses. Therefore if it is desired to regulate the current in the load LD in an interval comprising both negative and positive values, the linearity of the regulation would be irreparably endangered around the null current values and in addition appropriate circuitry would be necessary to generate the signals L1 and L2.

SUMMARY OF INVENTION

The purpose of the present invention is to supply a method of driving by the PWM procedure for bridge circuits and a circuit operating consequently and which would permit overcoming the shortcomings of the prior art.

More specifically, the invention relates to a method of driving a bridge by a PWM procedure of the type having a single input and a single output and at least two control inputs. The at least two control inputs receive respectively at least two conduction control signals of virtually square waves.

The invention also relates to a circuit for driving a bridge by a PWM procedure of the type having a single input and a single output and at least two conduction control inputs. The circuit includes a first virtually-square-wave generator having an output coupled to one of the two control inputs and a second virtually-square-wave generator having an output coupled to the other of the two control inputs.

A further embodiment of the invention includes a disk drive having at least a head, an electromagnetic actuator for positioning of the head, a motor for rotation of the disk, a reading and/or writing control system connected to the head, a position control system connected to the actuator, and a rotation control system connected to the motor. The position control system is for driving a bridge by a PWM procedure of the type having a single input, a single output, at least two conduction control inputs, and a first virtually-square-wave generator having an output coupled to one of the two control inputs and a second virtually-square-wave generator having an output coupled to the other of the two control inputs.

If instead of supplying to one of the two bridge circuit control inputs a conduction control signal having constant value and to the other a signal consisting of a virtually square wave two signals consisting of square waves are supplied to both the control inputs, the null current value will no longer constitute an intrinsic discontinuity and any value, even around zero, will be controllable with relative ease.

Then if it were desired to have variable regulation it would be particularly advantageous to set the duty cycle of both the square waves at 50% for the null current condition and vary the duty cycle of both the square waves in opposite directions and in accordance with the same law so as to obtain the best possible operating uniformity and symmetry.

BRIEF DESCRIPTION OF THE DRAWINGS

The present invention is clarified by the description given below considered together with the annexed drawings.

DETAILED DESCRIPTION OF THE INVENTION

Figure 1:
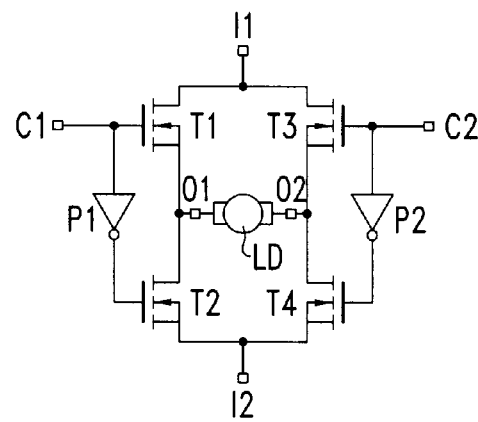
FIG. 1 shows a known bridge circuit usable for the present invention.
Figure 2:
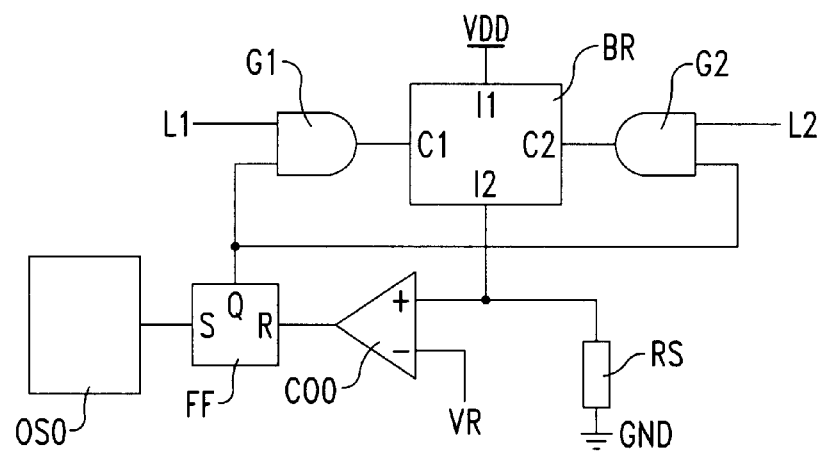
FIG. 2 shows a known type of driving circuit.

The method in accordance with the present invention is discussed with the aid of FIG. 1 which shows a bridge circuit of a known type. On the market there are many other types of bridge circuit which can be used to implement the present invention. For example, SGS-THOMSON MICROELECTRONICS provides the integrated circuit L298N having a double bridge circuit made up of bipolar transistors, and the integrated circuits L6201, L6202 and L6203 having bridge circuits made up of MOS transistors and also including a series of additional service circuits.

If the two terminals C1 and C2 are sent two conduction control signals consisting of two virtually square waves, the transistors T1,T2 constituting a first half-bridge circuit and the transistors T3,T4 constituting a second half-bridge circuit are both started and stopped alternatively. The term square wave is meant here merely as a signal which can assume in a stable manner only two levels and is not necessarily periodic.

If the load LD is a resistive load, current can run only if the transistors T1,T4 or T2,T3 are simultaneously in conduction. Hence, if the two square waves are virtually identical there will be virtually no current conduction in the load LD. If the two square waves are such that there are time intervals in which one of the two square waves is at a high level and the other square wave is at a low level then there is current conduction in the load during these difference intervals.

The above statement is strictly true only for resistive loads. For inductive loads, like direct current motors, it is necessary to allow for the accumulated flow in the inductor. More specifically, during the difference intervals, the load LD is applied the voltage present between the terminals I1 and I2 and hence the current in the load LD increases exponentially. During the rest of the time, the so-called 'recirculation' phase, the load LD is closed in a short circuit on itself and therefore the current in the load decreases exponentially. In general the time constants for charging and discharging the load LD are different and vary depending on operating conditions.

Regardless of the type of load, if the two square waves remain constant in frequency and phase long enough the average value of the current running in the load LD steadies at a rated operating value. This value depends on the duration of the difference intervals. It is thus clear that there is no intrinsic limit on reduction of this duration because this limit is linked to the mutual position of the rising and falling edges of the two square waves.

If the two waves have the same frequency, the average value of the current in the load depends on the value of the duty cycle. If the duty cycle is changed by at least one of the square waves, the average rated operating current changes.

When the duty cycle of both square waves change in the opposite direction, the effect of changing the current is greater. If the same change law is used for both, the effect will be double and in addition, if the duty cycle of both the square waves is set at 50% for the null current condition there is obtained the best possible operating uniformity and symmetry of the bridge circuit. For control purposes it is advantageous that the law be linear so as to have linear control.

If it is desired to provide current control of the feed-back type at the output, the duty cycle must be changed in relation to the average current supplied to the load. This is particularly true if the load is inductive.

When the load is inductive, the conduction control signals can be advantageously generated according to an embodiment of the invention through the following steps.

a) Detection of the current supplied at the output O1–O2,
b) generation of an error signal corresponding to the average value of the difference between the detected current and a reference signal corresponding to the average current value desired at the output O1–O2, and
c) generation of two difference signals of the logical type between the error signal and the two oscillating signals respectively in mutual phase opposition These two difference signals correspond to the conduction control signals, i.e., they can be used as they are or if necessary for example by adjusting the amplitude, level, etc., thereof.

For methodological purposes it makes no different in step b) if the difference is found first and then the average value or vice versa.

The oscillating signals could be e.g., sinusoid or, to obtain linear control, triangular waves. For the present method it is not necessary that their frequency and amplitude of oscillation be constant in time provided they both change together, slowly and in the same manner. This method is very simple and as a result can be provided in the circuitry as explained below.

Figure 3:
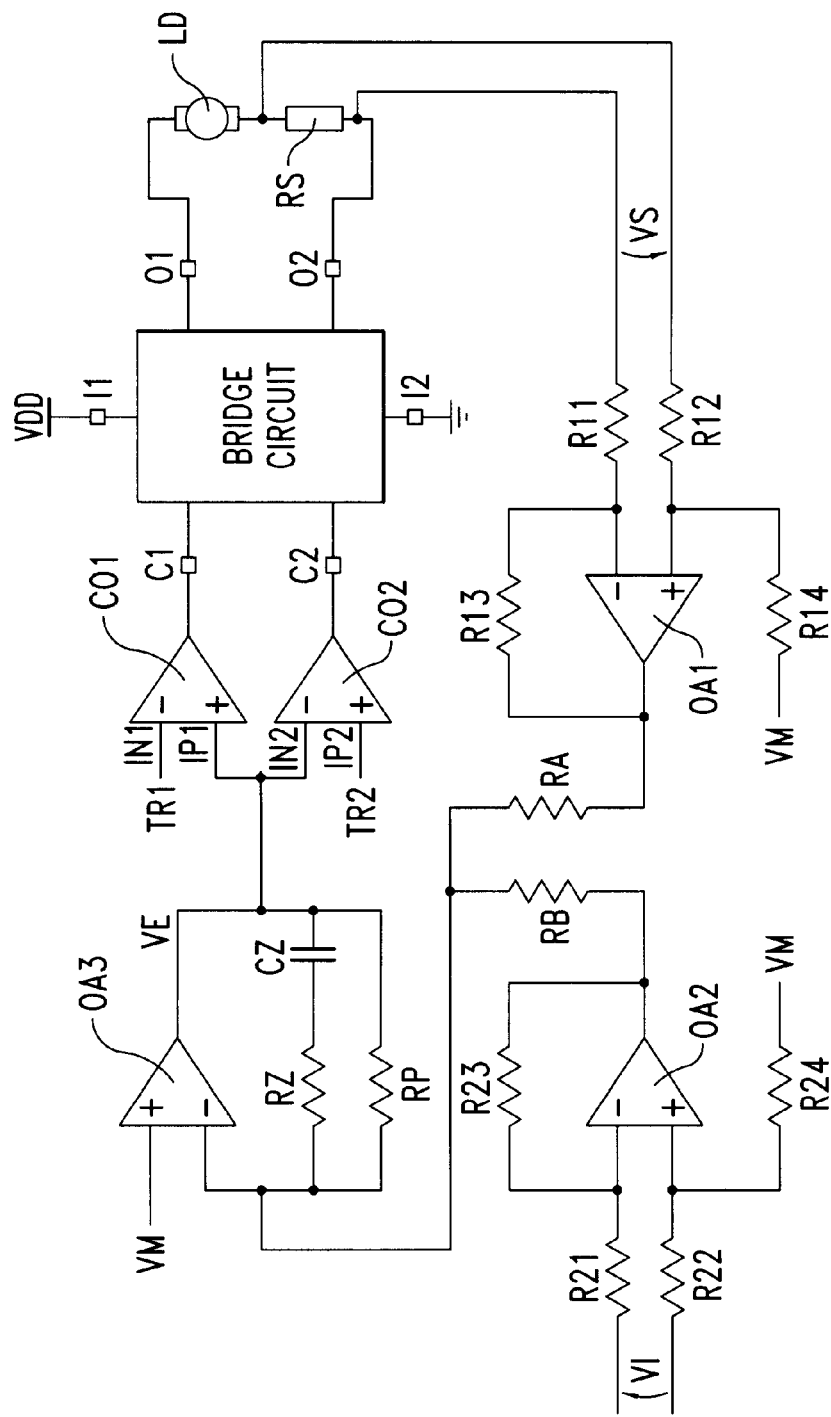
FIG. 3 shows a driving circuit in accordance with the present invention in combination with a known type of bridge circuit.

A driving circuit providing the method in accordance with the embodiment of the present invention is shown in FIG. 3. FIG. 3 also shows a similar bridge circuit BR of FIG. 1 connected to the driving circuit. In one embodiment, the circuit BR used with the invention is of a known type like that shown in FIG. 1, of which the terminology will be used and to which will be coupled a load LD at the output O1–O2 of the circuit BR.

The terminal I1 of the circuit BR is connected directly to the power reference VDD and the terminal I2 is connected directly to the ground reference GND.

The driving circuit comprises a first generator of virtually square waves and corresponds to a first comparator CO1 having its output coupled to the terminal C1 and a second generator of virtually square waves corresponding to a second comparator CO2 having its output coupled to the terminal C2. In this manner the conduction control signals of the bridge circuit BR consist of two square waves.

The comparator CO1 has a non-inverting input IP1 and an inverting input IN1. The comparator CO2 has a non-inverting input IP2 and an inverting input IN2.

In series with the load LD is located a resistor RS which acts as a detection circuit, in module and direction, of the current supplied at the output O1–O2. There are other alternative ways of detecting, in module and direction, the current in the load of a bridge circuit. The resistor in series was chosen for its simplicity.

The voltage VS which develops across the resistor RS is sent to a differential amplifier consisting of an operational amplifier OA1. The operational amplifier OA1 includes an inverting input connected to one of the terminals of the resistor RS through a resistor R11, a non-inverting input connected to the other terminal of the resistor RS through a resistor R12 and a feedback output on the inverting input through a resistor R13. In addition, the non-inverting terminal is connected to a potential reference VM through a resistor R14. This potential is one half the potential of the power reference VDD.

The driving circuit is also supplied a reference signal VI corresponding to the desired average value of the current at the output O1–O2. The signal VI is sent to a differential amplifier consisting of an operational amplifier OA2. The operational amplifier OA2 includes an inverting input connected to a first terminal of a resistor R21, a non-inverting input connected to a first terminal of a resistor R22, and a feedback output on the inverting input through a resistor R23. The voltage signal VI is applied to the second terminals of the resistors R21 and R22. In addition, the non-inverting terminal is connected to the potential reference VM through a resistor R24.

The outputs of the operation amplifiers OA1 and OA2 are connected together respectively through resistors RA and RB to the inverting input of an operational amplifier OA3. Operational amplifier OA3 exhibits a non-inverting input connected to the reference VM and is fed back by means of a feedback network connected between its output and its inverting input. The feedback network consists of the parallel connection between a resistor RP and between a series connection of a resistor RZ and a capacitor CZ.

The entirety of the operational amplifiers OA1, OA2, OA3 and of the dipoles connected thereto constitutes a comparator designed to generate an error signal VE corresponding to the average value of the difference between the current supplied and the current desired. This comparator has a low-pass transfer function mainly due to the pole introduced by the amplifier OA3.

The output of the amplifier OA3 is connected together with the inputs IP1 and IN2 respectively of the comparator CO1 and the comparator CO2. The inputs IN1 and IP2 receive respectively the two oscillating signals TR1 and TP2 in mutual phase opposition. More specifically, the two oscillating signals TR1 and TR2 are triangular waves with virtually constant frequency having a minimum value corresponding to the potential reference GND and maximum value corresponding to the potential reference VDD and hence an average value equal to the value of the potential reference VM.

The voltage signals of the driving circuit exhibit a fixed and equal offset at VDD/2. This is linked to the fact that the bridge and the driving circuit are powered by means of the same positive-only potential power source. The driving circuit does not prevent from having multiple power sources to avoid offset.

The circuit just described provides current control at the output of the feedback type, it is therefore essential to establish the regulation loop. For this purpose the feedback network of the amplifier OA3 introduces a zero to eliminate the effect of a pole usually introduced by the load of an electric motor.

Figure 4A:
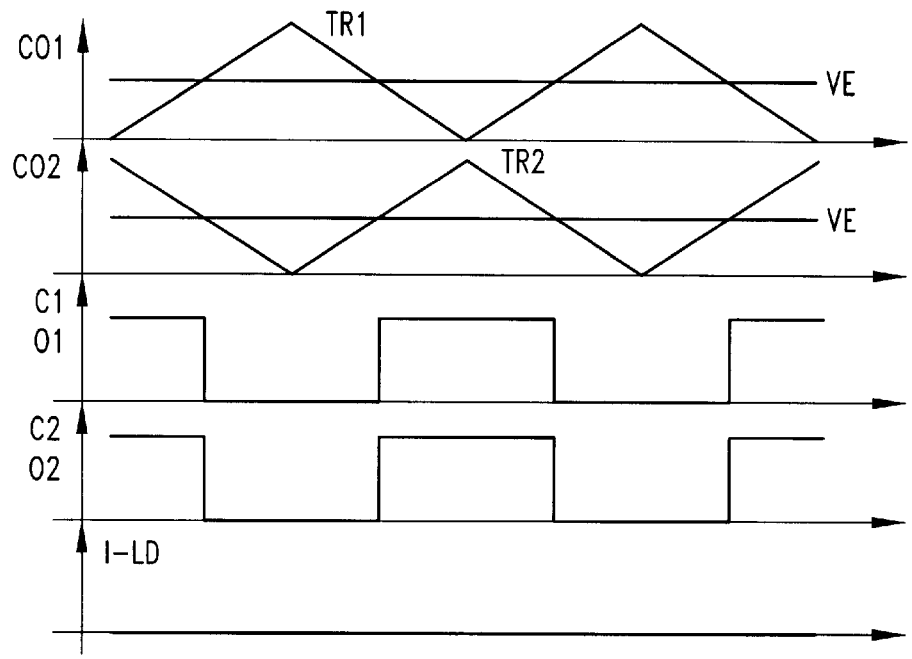
FIGS. 4A and 4B show two groups of time charts for voltage and current signals present in the driving circuit of FIG. 3 in two different operating conditions.

If the average current supplied corresponds to the average current desired and their difference is null, the voltage VE at the output of the amplifier OA3 is VDD/2. In this case the behavior of the signals TR1 and VE at the inputs of the comparator CO1, of the signals TR2 and VE at the inputs of the comparator CO2, of the voltages at the terminals C1, O1, C2, O2 and of the current I-LD in the load is shown in FIG. 4A. It is noted that the duty cycle of both the square waves is 50%.

Figure 4B:
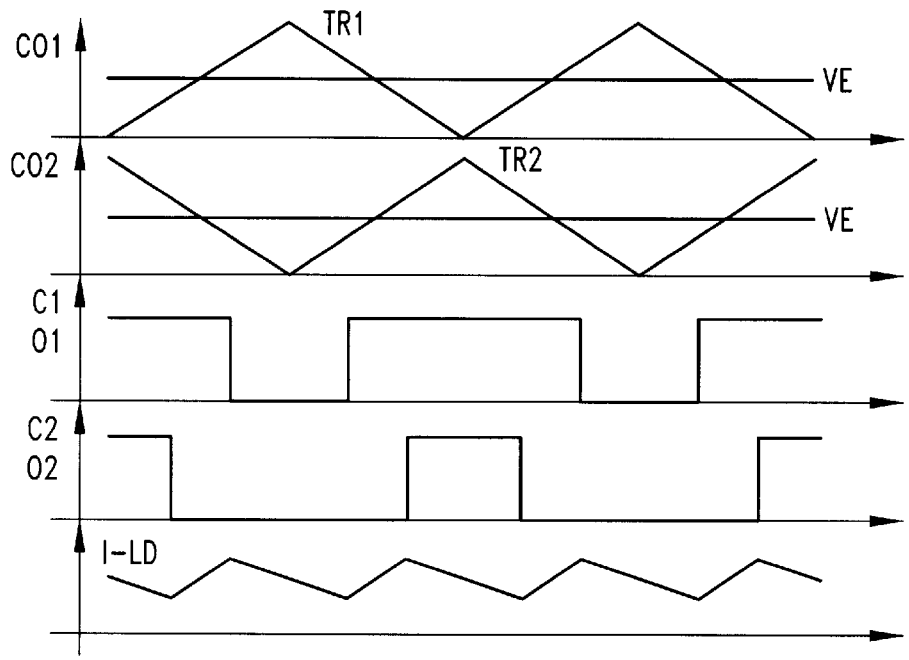

If the average current supplied corresponds to the average current desired and their difference is positive, i.e., it comes out of the terminal O1, the voltage VE at the output of the amplifier OA3 is greater than VDD/2. In this case the behavior of the signals TR1 and VE at the inputs of the comparator CO1, of the signals TR2 and VE at the inputs of the comparator CO2, of the voltages at the terminals C1, O1, C2, O2 and of the current I-LD in the load is shown in FIG. 4B. It is noted that the duty cycle of the square wave at the terminals C1 and O1 is 50% greater than e.g., 15%, while the duty cycle of the square wave at the terminals C2 and O2 is 50% less than that amount, i.e., 15% in the example.

If the average current supplied corresponds to the average current desired and the difference is negative, i.e., enters into the terminal O1, the voltage VE at the output of the amplifier OA3 is less than VDD/2 and the situation is the reverse of that of the last above case.

The linearity of the duty cycle variation is due to the decision to use triangular waves for the signals TR1 and TR2. The opposite direction of variation is due to the exchange of terminals of the comparators CO1 and CO2 and to the fact that the signals TR1 and TR2 are in mutual phase opposition. The offset of VDD/2 given by the reference VM involves the 50% duty cycle when the signal VI is null. Small positive or negative variations in this signal correspond to small variations in the duty cycle of the two square waves and small variations in the load current with truly optimal linearity and low distortion.

It can be noted in particular from FIGS. 4A and 4B that the wave frequency of the current I-LD is double the chopping frequency, i.e., of the switching frequency of the bridge circuit transistors. The result is that with respect to the circuits of the prior art the amplitude of the waves is less or that, for equal wave amplitude, a smaller chopping frequency can be chosen with resulting decrease in switching losses.

In the circuit of FIG. 3 the signals TR1 and TR2 were represented as though supplied at input to the driving circuit. It is possible to include in the driving circuit a circuitry designed to generate signals TR1 and TR2. By selecting appropriately the topology of this circuitry it is possible that with a single triangular-wave generator and a small additional circuit, there can be achieved both of the signals. This provides the advantage of having the frequencies and phases of the two signals rigorously coupled. A driving circuit like that described lends itself to being integrated in a chip.

In such a chip, if necessary or desired, it is possible to integrate e.g., the bridge circuit and/or additional circuitry for auxiliary functions and/or even the entire control circuitry of a direct current electric motor as e.g., in the integrated circuit L6515 of SGS-THOMSON MICRO-ELECTRONICS.

Figure 5:
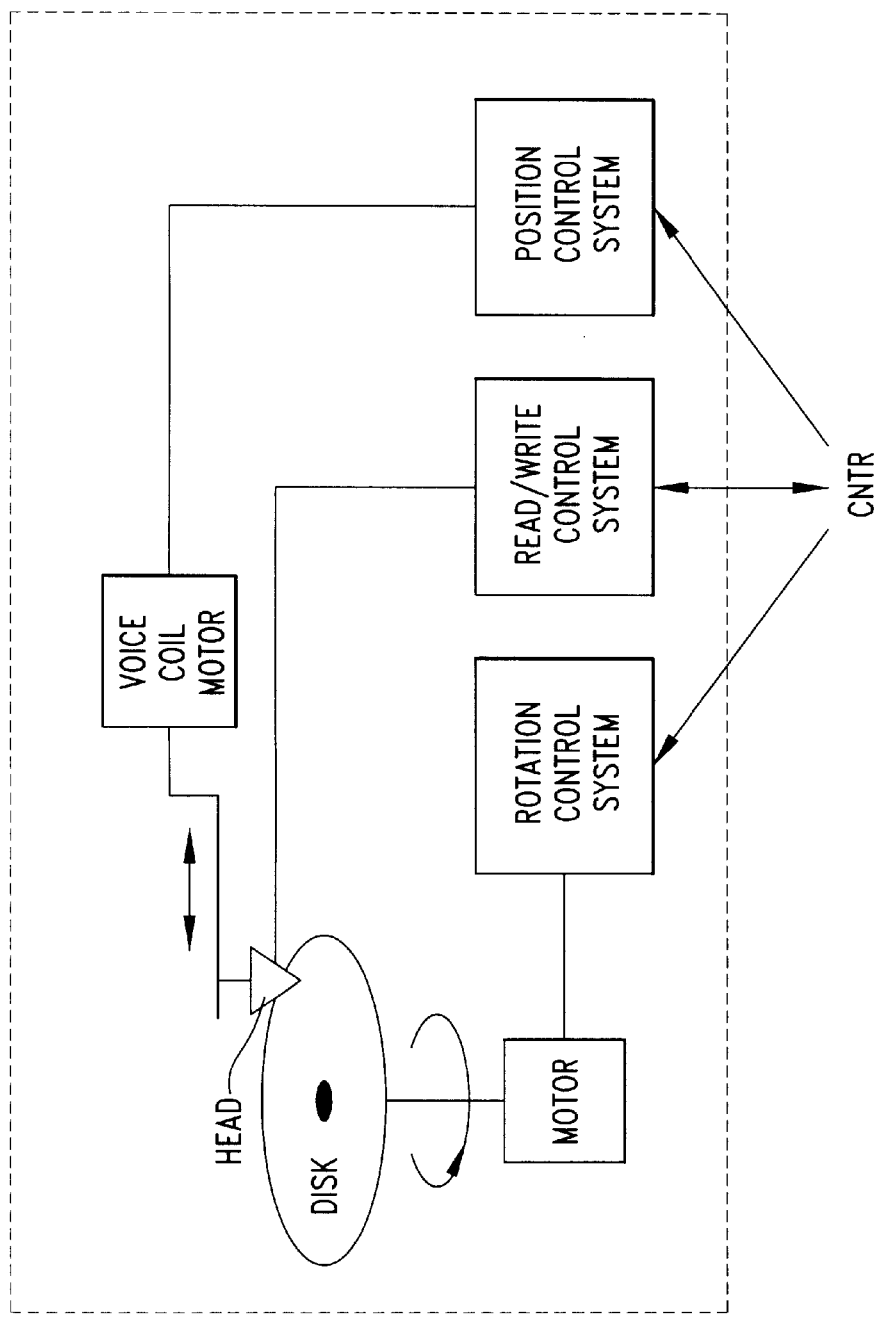
FIG. 5 shows a block diagram of a disk drive in accordance with the present invention.

As already mentioned, the driving circuit lends itself very well to use in a disk drive of which a very general block diagram is shown in FIG. 5 according to the embodiment of the invention. The disk drive includes a head H, an electromagnetic actuator VCM, typically a voice coil motor, for positioning of the head H, a motor SM for rotation of a disk DSK, a reading and/or writing control system RWCS connected to the head H, a position control system PCS connected to the actuator VCM, and a rotation control system RCS connected to the motor SM.

More often, these disk drives comprise a certain number of disks and consequently a certain number of heads interconnected mechanically. The other components in a disk drives system are generally known in the art. For example, the head H, the magnetic actuator VCM, the motor SM, the reading and/or writing control system RWCS, and the rotation control system RCS are, as such, well known in the art. The internal details of these components do not constitute the invention and any suitable such circuits are acceptable.

Disk drives of this type are used normally in personal computers both for floppy disks and hard disks. They generally require a card to be connected to the computer bus. Between the drive, in particular the RCS, PCS, RWCS control systems contained therein, and the card, there is a continuous exchange of electrical signals CNTR including data to be written, data read, positioning commands, motor start and stop commands, etc., as is known in the art.

The driving circuit in accordance with the present invention is used in combination with the bridge circuit BR in the head position control system, PCS. The actuator VCM is preferably a translating motor in which movement depends on the average current circulating therein. By controlling this current through the present driving circuit, which has good linearity, it is possible to achieve positioning of good accuracy. The present invention used in the PCS provides accurate and exact control of the translating motor, VCM, for improved writing and reading of data to and from the disk.

For the motor SM it is generally preferred to use a brushless direct current motor with at least three windings requiring a different method and driving circuit. But if a common direct current spindle motor is used the driving circuit in accordance with the present invention could find application even in the rotation control system RCS.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method for driving a bridge circuit having a signal input and a signal output and at least two control inputs by a Pulse Width Modulation procedure, comprising:

generating a first approximately square wave signal with a variable first duty cycle;

generating a second approximately square wave signal with a second duty cycle that is dependent on the approximately first square wave signal, both the first and second approximately square wave signals being high for selected coincident periods of time and being low for selected coincident periods of time;

varying said first duty cycle in a first manner to vary said second duty cycle in a second manner opposite to said first manner; and providing to said at least two control inputs at least two conduction control signals, respectively, one of said conduction control signals comprising said first approximately square wave signal and the other of said conduction control signals comprising said second approximately square wave signal.

2. The method of claim 1, further comprising:

linearly varying said first duty cycle in a first manner; and linearly varying said second duty cycle in a second manner opposite to said first manner.

3. The method of claim 1, further comprising:

selecting said first duty cycle to be 50%; and selecting said second duty cycle to be 50% such that the bridge circuit does not supply substantial current to said signal output.

4. The method of claim 1, further comprising:

varying said first duty cycle based on an average current supplied by the bridge circuit to said signal output; and varying said second duty cycle based on the average current supplied by the bridge circuit to said signal output.

5. The method of claim 4 wherein said acts of generating a first approximately square wave si(nal and generating a second approximately square wave signal comprise:

detecting a current supplied at the signal output;

generating an error signal corresponding to an average value of a difference between the detected current supplied at the signal output and a reference signal corresponding to an average current value desired at the signal output; and generating two logical difference signals between the error signal and two respective oscillating signals in mutual phase opposition, the two logical difference signals being said first and second approximately square wave signals.

6. A circuit for driving by a PWM procedure a bridge circuit having a signal input and a signal output and at least two conduction control inputs, the circuit comprising a first approximately square wave generator structured to generate a first approximately square wave conduction control signal with a variable first duty cycle and having an output coupled to one of said two conduction control inputs and a second approximately square wave generator structured to generate a second approximately square wave conduction control signal with a second duty cycle that is dependent on the first approximately square wave signal, both the first and second approximately square wave conduction control signals being high for selected coincident periods of time, the second approximately square wave generator having an output coupled to the other of said two conduction control inputs.

7. The circuit of claim 6 wherein said first approximately square wave generator has a control input for control of the duty cycle of the approximately square wave conduction control signal generated by the first and second square wave generators.

8. The circuit of claim 7 wherein each of the approximately square wave generators includes a control input, the control inputs of the approximately square wave generators being coupled together to receive a signal such that the first duty cycle of the first approximately square wave signal is varied linearly in a first direction and the second duty cycle of the second approximately square wave signal is varied linearly in a second direction opposite to the first direction.

9. The circuit of claim 7 wherein a non-conduction condition of the bridge circuit is obtained when the first and second approximately square wave generators each generate an approximately square wave signal with a duty cycle of 50%.

10. The circuit of claim 7, further including a feedback network having an input coupled to said signal output to detect an average current supplied thereto and having an output coupled to the control input of at least one of said approximately square wave generators.

11. The circuit of claim 10, further comprising:
   a detection circuit for detecting current supplied to said signal output;
   a first comparator with a transfer function of a low-pass type having a first input coupled to an output of said detection circuit and a second input receiving a reference signal corresponding to a desired average value of current supplied to said signal output;
   a second comparator having a first input coupled to receive a first oscillating signal and a second input; and
   a third comparator having a first input coupled to receive a second oscillating signal and a second input coupled to the second input of the second comparator and to an output of said first comparator the second oscillating signal being in phase opposition to said first oscillating signal.

12. The circuit of claim 11, further comprising at least one approximately triangular wave generator having at least one output coupled to the first input of said second comparator and the first input of said third comparator.

13. The circuit of claim 12 wherein said circuit is an integrated circuit in a chip.

14. The circuit of claim 6, further comprising a disk drive circuit having at least a disk, a head, an electromagnetic actuator for positioning of said head, a motor for rotation of said disk, a reading and/or writing control system connected to said head, a position control system coupled to said electromagnetic actuator and a rotation control system coupled to said motor.

15. A method for driving a bridge circuit having a signal output and two control inputs by a Pulse Width Modulation procedure, comprising:
   providing first and second substantially square wave control signals to said two control inputs, the first and second substantially square wave control signals being high for selected coincident periods of time and being low for selected coincident periods of time; and
   linearly varying a duty cycle of the first substantially square wave control signal in a first direction to vary the second substantially square wave control signal in the opposite direction of the first control signal, said duty cycle is varied in relation to an average current supplied by the bridge circuit to said signal output.

16. The method of claim 15, further comprising:
   sensing a current supplied by the bridge circuit at the signal output;
   generating an error signal based on an average value of a difference between the sensed current and a reference signal, the reference signal being based on an average current value desired at the signal output; and generating two logical difference signals from the error signal and two respective oscillating signals in mutual phase opposition, the two logical difference signals comprising said substantially square wave control signals.

17. A circuit for driving a bridge circuit by a PWM procedure, comprising:
   a load element coupled between a first terminal and a second terminal of said bridge circuit;
   a first comparator circuit having a supply input, a reference input and an error output, said supply input being coupled to said load element and said reference input being coupled to a reference potential; and
   a second comparator circuit having an intermediate node, first and second generator inputs and first and second outputs, said first and second outputs are coupled to said bridge circuit and said intermediate node is coupled to said error output, said first and second generator inputs being coupled to receive first and second oscillating signals in mutual phase opposition respectively and said first comparator circuit being structured to provide a signal based on a difference between a voltage at said supply input and a voltage at said supply input and a voltage at said reference input at said error output; said first and second generator inputs are coupled to first and second triangular wave generators, the first triangular wave generator being structured to generate a first triangular wave in a first manner and the second triangular wave generator being structured to generate a second triangular wave that is dependent on and in a manner that is opposite opposition to the first triangular wave.

18. The circuit of claim 17, further including a resistive element coupled between said load element and said second terminal.

19. The circuit of claim 18 wherein said first and second generator inputs are coupled to first and second triangular wave generators, the first triangular wave generator being structured to generate a first triangular wave and the second triangular wave generator being structured to generate a second triangular wave in phase opposition to the first triangular wave.

20. The circuit of claim 19 wherein said signal provided at said error output controls a duty cycle of each of two square waves provided at said first and second outputs of said second comparator circuit, respectively.

21. The method of claim 15 wherein the act of linearly varying a duty cycle of at least one of said two substantially square wave control signals comprises:
   varying a duty cycle of a first one of said two substantially square wave control signals in a first direction; and
   varying a duty cycle of a second one of said two substantially square wave control signals in a second direction opposite to the first direction.

22. A method for driving current to a load through a full bridge circuit, a first terminal of the load being coupled between a first upper transistor and a first lower transistor in the full bridge circuit and a second terminal of the load being coupled between a second upper transistor and a second lower transistor in the full bridge circuit, the method comprising:
   generating a first square wave control signal with a variable first duty cycle;
   generating a second square wave control signal with a second duty cycle, that is dependent on the first square wave signal, both the first and second square wave signals being high for selected coincident periods of time and being low for selected coincident periods of time;

rendering the first upper transistor conductive according to the first square wave signal;

inverting the first square wave signal to generate an inverted first square wave signal;

rendering the first lower transistor conductive according to the second square wave signal;

rendering the second upper transistor conductive according to the second square wave signal;

inverting the second square wave signal to generate an inverted second square wave signal;

rendering the second lower transistor conductive according to the inverted second square wave signal; and varying the first duty cycle of the first square wave signal with respect to the second duty cycle of the second square wave signal.

23. The method of claim 22, further comprising:

sensing a current in the load;

venerating an error signal based on an average value of a difference between the sensed current in the load and a reference signal based on a target average current for the load;

selecting the first duty cycle and the second duty cycle based on the error signal;

permitting the current in the load to recirculate through the first and second upper transistors when the first and second upper transistors are in a conductive state; and permitting the current in the load to recirculate through the first and second lower transistors when the first and second lower transistors are in a conductive state.

\* \* \* \* \*